INVENTOR:
WOLFGANG SPINDLER
By Kurt Kelman
AGENT

Dec. 12, 1967  W. SPINDLER  3,357,049
EXTRUDER CONTROL SYSTEM
Filed Dec. 20, 1965  2 Sheets-Sheet 2

INVENTOR:
WOLFGANG SPINDLER
By
Kurt Kelman
AGENT

United States Patent Office 3,357,049
Patented Dec. 12, 1967

3,357,049
EXTRUDER CONTROL SYSTEM
Wolfgang Spindler, Eichendorffweg 17,
Gerlingen, Germany
Filed Dec. 20, 1965, Ser. No. 515,027
Claims priority, application Germany, Dec. 18, 1964,
S 94,690
6 Claims. (Cl. 18—12)

ABSTRACT OF THE DISCLOSURE

A system for controlling the flow of molten plastic through the die opening of an extruder so that a uniform throughput is assured while the viscosity of the plastic is kept constant. The extruder comprises an axially reciprocable, rotatable screw, and the back pressure on the screw, measured immediately before the die opening, controls the axial reciprocation of the screw as well as its rotational speed.

---

The present invention relates to plastic extruders, and more particularly to systems for controlling the flow of molten plastic through the die opening of an extruder.

Conventional plastic extruders comprise an elongated cylindrical housing having a feed hopper at one end and an extrusion die with a die opening at the other end, suitable heating and/or cooling means being arranged along the housing to keep the plastic at the desired temperature. The plastic is fed into the extruder through the hopper in particulate form and is molten therein while being conveyed by an axially reciprocable, rotatable screw mounted in the housing. The molten plastic stream leaves the extruder through the extrusion orifice or die opening whereto it is propelled by the screw being rotated by an infinitely variable speed drive, preferably a hydraulic motor. One end of the screw passes through a constricted annular passage of a diameter varying with the axial position of the screw, and the extrusion die defines a chamber between the annular passage and the die opening. The molten plastic in this chamber produces a back pressure loading the screw axially in one direction. A pressure fluid operated piston is operatively connected to the screw and loads the same axially in the opposite direction. In this manner, axial reciprocation of the screw varies the diameter of the constricted annular passage, through which the molten plastic flows, and thus changes the back pressure if all other operating conditions remain constant. This is important when a thermoplastic synthetic resin of relatively low viscosity in the molten state is extruded since the back pressure of the molten plastic is a function of its viscosity. Provided the properties of the plastic and all other operating variables of the extruder remain unchanged, a given back pressure theoretically produces uniform plastic throughput and a uniformity in the homogeneity and temperature of the molten plastic. In practice, variables in the extrusion operation cause many disturbances in the equilibrium of the back pressure.

A variable in the back pressure is also introduced by differently sized die openings producing differences in the resistance to the flow of the molten plastic through the die opening so that changes in the die cause different plastic flow and temperature. If the back pressure in the extrusion die increases considerably because of clogged breaker plates or screens, for instance, the plastic throughput is correspondingly reduced, causing undesirable changes in the dimensions of the extruded plastic. Reversed changes occur when such clogged breaker plates are removed from the extruder and the operating personnel notices these changes only after a lapse of time, whereupon the rotational speed and/or the axial position of the screw is manually changed to restore the original throughput and produce a homogeneous plastic stream of uniform dimensions.

It is the primary object of the present invention to overcome these and other disadvantages of conventional extruders of the indicated type, and to provide an automatic control system responsive to changes in the extruding operation to maintain a uniform throughput of molten plastic.

This and other objects are accomplished in accordance with this invention by providing a pressure gage arranged to measure the back pressure in the extrusion die chamber between the constricted annular passage and the die opening. Valve means is provided for respectively controlling the pressure fluid flow to and from the pressure fluid operated piston and the valve means is operatively connected to the pressure gage and is responsive to the pressure measured thereby. Furthermore, electrical control means is responsive to the back pressure and controls the infinitely variable speed drive to regulate the rotational speed of the drive in response to the measured pressure.

Two pressure gages are provided, one to measure the back pressure and another one to measure the pressure of the fluid operating the piston. The valve means is electrically connected to the second pressure gage and respectively controls the pressure fluid flow to and from the pressure fluid operated piston in response to the pressure measured by the second gage. An electrical control circuit between the other pressure gage and the speed drive regulates the rotational speed of the drive in response to the pressure measured by the other gage.

According to a preferred feature of the invention, a fixed annular ring is arranged in the interior wall of the extruder housing and a torpedo is carried by one screw end, the ring and torpedo defining the annular passage of variable diameter, and the torpedo preferably having a curvilinear surface configuration designed to vary the annular passage diameter in linear progression for each unit of length of the axial movement of the screw.

The above and other objects, advantages and features of the present invention will become better understood by consideration of the following detailed description of certain preferred embodiments thereof, taken in conjunction with the accompanying drawing wherein FIG. 1 schematically illustrates one embodiment of a control system for a plastic extruder, the latter being shown partly in longitudinal section;

Like reference numerals are used for like parts operating in a like manner in all figures of the drawing to obviate redundancies in the description.

Figure 1:
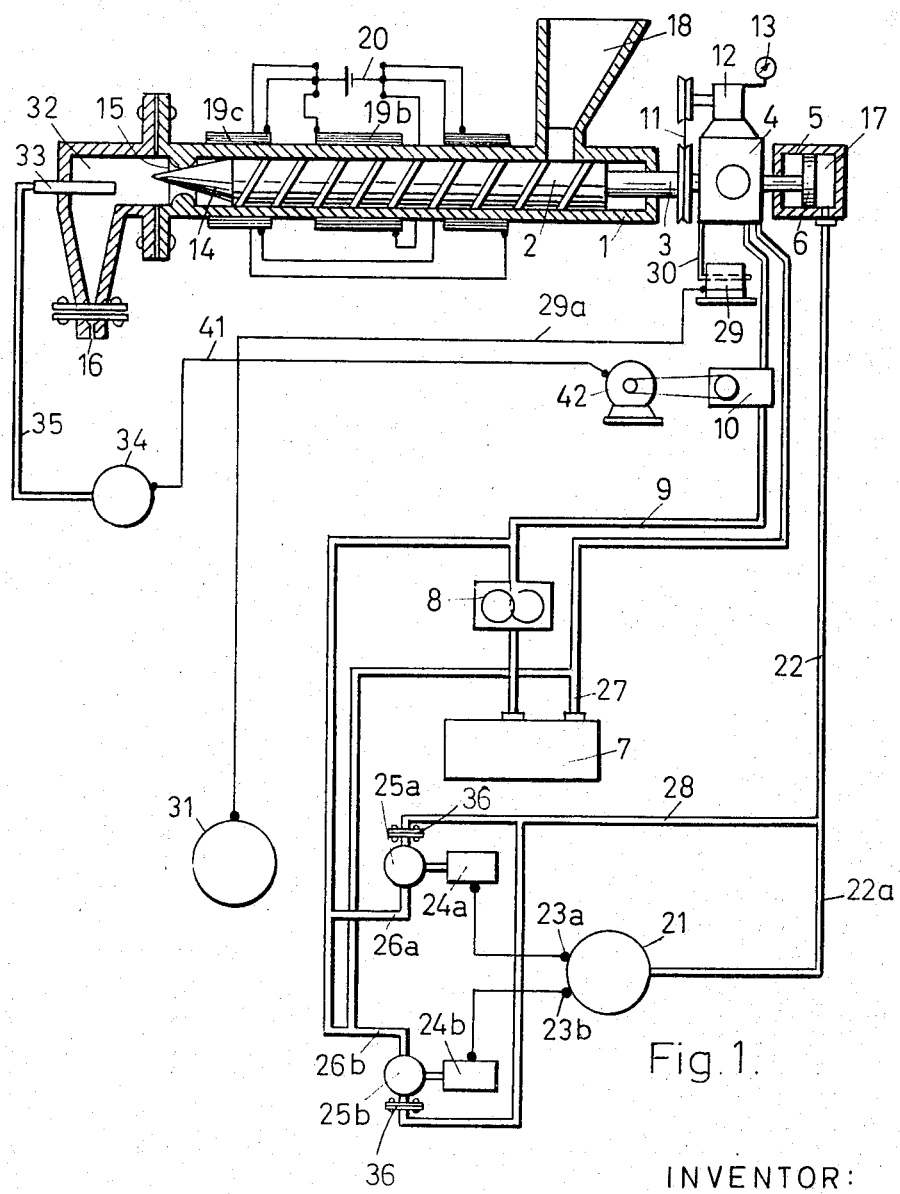

The extruder is shown to comprise an elongated cylindrical housing 1 wherein the screw 2 is mounted for rotation and axial reciprocation. An infinitely variable speed drive constituted in the illustrated embodiment by hydraulic motor 4 is arranged to rotate drive shaft 3 which carries screw 2 at one end thereof. The other end of the drive shaft is connected to piston 6 which is mounted for reciprocation in the direction of the axis of cylindrical housing 1 in hydraulic cylinder 5. Varying delivery of pressure fluid to cylinder chamber 17 causes the piston to reciprocate and thus to move the drive shaft and the attached screw 3 axially in housing 1, hydraulic motor 4 moving with the drive shaft during reciprocation of the screw.

Axially reciprocable and rotatable conveyor screw 2 carries a torpedo 14 passing through an annular ring in the interior housing wall, the torpedo and ring defining an annular passage 15 of variable diameter, which depends on the axial position of the screw and may be varied by its axial reciprocation. In the illustrated embodiment, the torpedo has a curvilinear surface configuration designed to vary the diameter of annular passage 15 in linear progression for each unit of length of the axial movement of the screw.

Plastic is fed into the extruder through hopper 18 at one end of the extruder housing and is conveyed to the downstream end of the housing by rotating screw 2, the plastic being heated during its passage through the extruder by heaters 19a, 19b, 19c and the molten plastic flowing through annular passage 15 into the extrusion die having orifice 16. The extrusion die and the torpedo 14 define a chamber 32 wherein the molten plastic creates a back pressure acting upon the screw in an axial direction opposite to that of the piston 6. Any change in the diameter of the annular passage 15, causing a corresponding change in the throughput of the molten plastic flowing therethrough, produces a change in the back pressure in chamber 32 and thus tends to change the axial position of the screw which this back pressure is exerted. This back pressure and corresponding axial movement of the screw is counterbalanced by the pressure exerted upon the screw in the opposite direction by piston 6. Thus, the size of the annular passage 15, which depends on the axial position of screw 2, is at all times a function of the pressure equilibrium between the back pressure in chamber 32 and the hydraulic pressure exerted upon piston 6 in chamber 17.

The electric heaters 19a, 19b, 19c surround the extruder housing 1 and are controlled by electrical circuit 20 to provide the required heat for the plastic being extruded.

Hydraulic fluid is delivered to hydraulic motor 4 from storage tank 7, constant pressure pump 8 in input line 9 supplying hydraulic fluid to the motor while return line 27 connects the motor with the storage tank. A conventional fluid distributor or governor 10 determines the amount of hydraulic fluid delivered to motor 4 in a given time unit, thereby controlling the speed of the motor at a given fluid pressure. A belt drive 11 connects drive shaft 3 with tachometer 12 so that the rotational speed of the shaft is constantly measured and may be read on meter 13. If desired, the tachometer reading may be transmitted to a switchboard where an operator may at all times note the rotational speed of drive shaft 3.

The axial reciprocation of the drive shaft and screw 3 is controlled by the pressure in chamber 17 which receives hydraulic fluid through input line 22. In the embodiment of FIG. 1, a branch line 22a places a pressure gage 21 in communication with chamber 17 and the pressure gage thus measures the pressure in the chamber. Limit switches 23a and 23b, respectively, are in electrical connection with solenoids 24a and 25b, respectively, which control valves 25a and 25b. The solenoid valves are conventional and are mounted in line 28 connected to line 22 so that the valves control the hydraulic fluid delivery from storage tank 7 into chamber 17. Solenoid valve 25a controls the flow of hydraulic fluid through line 26a leading from the output of pump 8 to the input line 22. Solenoid valve 25b, on the other hand, controls this hydraulic fluid flow through line 26b leading from the return line 27 to input line 22.

Thus, when operating conditions call for an axial movement of the screw in the downstream direction to constrict the annular passage 15 and thus to reduce plastic flow therethrough, the corresponding lack of pressure in chamber 17 will be read by pressure gage 21 and its minimum pressure indicating switch 23a will cause solenoid valve 25a to be opened. Pump 8 will deliver hydraulic fluid through lines 26a, 28 and 22 into chamber 17, thus increasing the pressure in chamber 17 and moving the piston 6 to move the screw 3 in the downstream direction. When the pressure in chamber 17 has reached the predetermined maximum value, maximum pressure indicating switch 23b of pressure gage 21 will cause solenoid valve 25a to close and solenoid valve 25b to open, whereby hydraulic fluid will return into the storage tank 7 through lines 22, 28, 26b and 27, thus decreasing the pressure on piston 6.

Figures 2, 3:
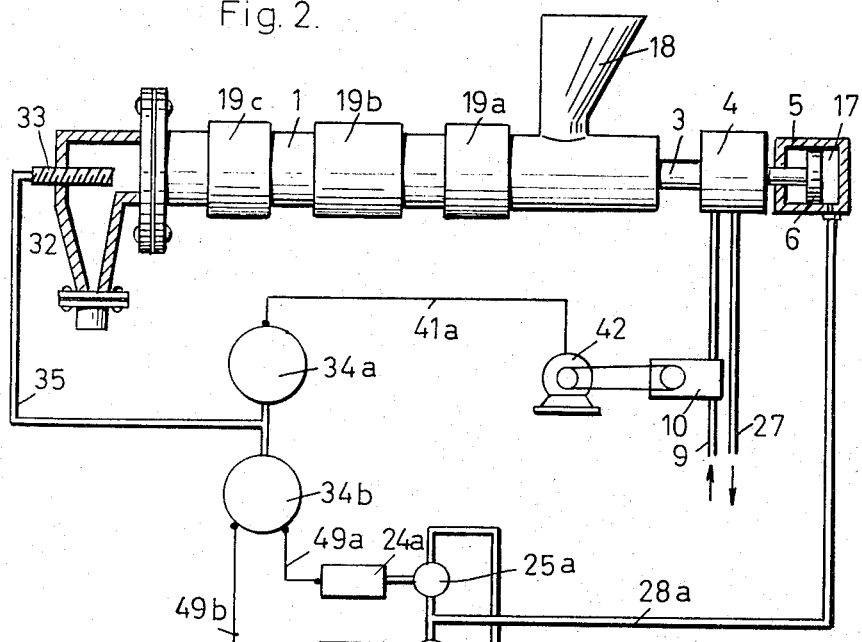
FIG. 2 shows another embodiment.
FIG. 3 is a sectional view of a safety device protecting the control systems against sudden pressure increases.

To prevent undesirably rapid inflow or outflow of hydraulic fluid into and from chamber 17, control elements 36 may be mounted in the lines leading to solenoid valves 25a and 25b. As shown in FIG. 3, such control elements may comprise a stop plate 37 positioned transversely of the fluid flow in fluid line 26a and having a constricted bore 38 permitting only a slow flow of fluid therethrough. The flow control plate 37 may be mounted between flanges 39, 40 in the line 26a.

If desired, the control of the axial movement of the screw may be effectuated by a single pressure gage in communication with chamber 32 to make this movement dependent solely on the back pressure sensed in this chamber, in which case gage 21 may be eliminated. As shown in FIG. 1, a pressure gage 34 is connected by line 35 to pressure sensing element 33 extending into chamber 32 in the extrusion die. Pressure gage 34 is electrically connected by conductor 41 to motor 42. Upon a predetermined back pressure being reached in chamber 32, pressure gage 34 will operate motor 42. Operation of motor 42 will actuate the hydraulic fluid distributor 10 in input line 9 so as to vary the delivery of pressure fluid to the hydraulic motor 4.

The back pressure produced in chamber 32 by the molten plastic depends on the amount of plastic delivered thereinto by rotating screw 32 in a given time unit in relation to the resistance offered to the plastic flow by die opening 16 and/or any screen or breaker plates (not shown) that may be mounted in chamber 32 between annular passage 15 and die opening 16. The amount of molten plastic delivered to chamber 32 depends on the rotational speed of the screw. Other operating conditions being equal, the faster the screw is rotated, the more molten plastic will be delivered into chamber 32 and to die opening 16. If, under otherwise unchanged operating conditions, uniform plastic delivery to chamber 32 is desired, the back pressure in the chamber must remain substantially constant.

Under like operating conditions, the back pressure exerted by the molten plastic upon the axially reciprocable screw 2 and causing the screw to move against the counter-pressure of piston 6 is also an indicator of the viscosity of the flowing plastic. If the extruded plastic assumes varying viscosities, i.e. the back pressure changes, the corresponding change in the pressure in chamber 17 on piston 6 will initiate the above-described operation of solenoid valves 25a or 25b to cause such axial movement of the screw that the annular passage 15 will be constricted or enlarged in a manner to assure a uniform throughput of the molten plastic despite any changes in its viscosity. However, the axial position of the screw is itself a function of the changing viscosity. To determine this axial position, i.e. the linear movement of the screw in relation to the housing, and electromechanical odometer 29 is fixedly mounted adjacent hydraulic motor 4 (or any portion of screw 2 or drive shaft 3, the screw, the shaft and the motor forming a rigid unit which axially moves together). The odometer is operated by element 30 fixedly mounted on motor 4 (or any other portion of the rigid unit) and is calibrated to indicate the varying diameters of the constricted annular passage 15. The odometer converts the linear movement of the element 30, which may be an iron bar, within an inductive coil in a conventional manner into electrical signals which may be made visible on a suitably calibrated instrument 31 electrically connected to the odometer coil and showing viscosity values of a given plastic under given extruding conditions.

Useful instruments of this type are obtainable from and described in the literature of Hottinger Baldwin Messtechnik GmbH, 61 Darmstadt, Germany, for instance, in their pamphlets entitled "Induktive Wegaufnehmer," "Miniatur- Industrie-Geraete" and "Kompensatoren mit selbsttaetigem Abgleich," the electrical measurement of mechanical parameters being well known.

In the embodiment of FIG. 2, only a single pressure gage is used to control the axial position of the screw. This pressure gage is responsive to the back pressure in chamber 32 and includes two scales 34a and 34b. Scale 34a is electrically connected with governor 10 by conduit 41a, thus controlling the flow of hydraulic fluid to motor 4 and the rotational speed of the drive shaft 3. The limit switches of the other scale 34b are electrically connected by conduits 49a and 49b with solenoids 24a and 24b, respectively, to actuate solenoid valves 25a and 25b in line 28a in the above-described manner, to control the amount of hydraulic fluid in chamber 17 and thus the axial movement of the screw.

While the invention has been described in connection with certain embodiments thereof for purposes of illustration, it will be clearly understood that many modifications and variations may occur to those skilled in the art, particularly after benefiting from the present teaching, without departing from the spirit and scope of this invention as defined in the appended claims.

I claim:

1. A system for controlling the flow of molten plastic through the die opening of an extruder,
   (1) the extruder comprising
      (a) an elongated cylindrical housing having a feed hopper at one end and an extrusion die with an opening at the other end, and
      (b) an axially reciprocable, rotatable screw mounted in the housing, a torpedo carried by one end of the screw, a fixed ring arranged near the other end of the housing, the ring and the torpedo defining a constricted annular passage of a diameter varying with the axial position of the screw, and the extrusion die defining a chamber between the annular passage and the die opening, the molten plastic in said chamber producing a back pressure loading the screw axially in one direction,
      (c) an infinitely variable speed drive operatively connected to the screw for rotating the screw, and
      (d) a pressure fluid operated piston operatively connected to the screw and loading the screw axially in a direction opposite to said one direction; and
   (2) the control system comprising
      (e) pressure gage means arranged to measure the back pressure in said chamber,
      (f) valve means respectively controlling the pressure fluid flow to and from the pressure fluid operated piston, the valve means being operatively connected to the pressure gage means and being responsive to the pressure measured thereby, and
      (g) electrical control means responsive to said back pressure and controlling the infinitely variable speed drive for regulating the rotational speed of the drive in response to the measured pressure.

2. The system of claim 1, wherein the torpedo has a curvilinear surface configuration designed to vary the diameter of the annular passage in linear progression for each unit of length of the axial movement of the screw.

3. The system of claim 1, wherein the infinitely variable speed drive is a hydraulic motor, further comprising
   (h) a hydraulic fluid input line for the motor, and
   (i) an electrically operated means arranged in the input line for varying the hydraulic fluid input through said line, the electrical control being connected to said electrically operated means.

4. The system of claim 1, further comprising an odometer associated with the screw for measuring the axial movement thereof, the odometer being calibrated to indicate the varying diameters of the constricted annular passage.

5. The system of claim 1, further comprising fluid flow control elements associated with said valve means, said control elements including a constricted passage through which the fluid flows to and from the piston.

6. A system for controlling the flow of molten plastic through the die opening of an extruder,
   (1) the extruder comprising
      (a) an elongated cylindrical housing having a feed hopper at one end and an extrusion die with an opening at the other end, and
      (b) an axially reciprocable, rotatable screw mounted in the housing, a torpedo carried by one end of the screw, a fixed ring arranged near the other end of the housing, the ring and torpedo defining a constricted annular passage of a diameter varying with the axial position of the screw, and the extrusion die defining a chamber between the annular passage and the die opening, the molten plastic in said chamber producing a back pressure loading the screw axially in one direction,
      (c) an infinitely variable speed drive operatively connected to the screw for rotating the screw,
      (d) a pressure fluid operated piston operatively connected to the screw and loading the screw axially in a direction opposite to said one direction,
      (e) a first pressure gage arranged to measure the back pressure in said chamber,
      (f) a second pressure gage arranged to measure the pressure of the fluid operating the piston; and
   (2) the control system comprising
      (g) valve means electrically connected to the second pressure gage and respectively controlling the pressure fluid flow to and from the pressure fluid operated piston, the valve means being responsive to the pressure measured thereby, and
      (h) an electrical control circuit between the first pressure gage and the infinitely variable speed drive for regulating the rotational speed of the drive in response to the measured pressure.

References Cited

UNITED STATES PATENTS

| | | | |
|---|---|---|---|
| 2,411,971 | 12/1946 | MacMillen et al. | 18—12 |
| 2,747,224 | 5/1956 | Koch et al. | 18—2 |
| 2,977,631 | 4/1961 | Komarek et al. | 18—2 |
| 3,032,822 | 5/1962 | Maddock. | |
| 3,090,992 | 5/1963 | Schlachter et al. | 18—12 |
| 3,111,707 | 11/1963 | Buckley | 18—2 |
| 3,113,343 | 12/1963 | Heston | 18—12 |
| 3,248,469 | 4/1966 | Kosinsky et al. | |

WILLIAM J. STEPHENSON, *Primary Examiner.*